Patented Aug. 12, 1941

2,252,495

UNITED STATES PATENT OFFICE 2,252,495

VITREOUS COMPOSITION

Werner Düsing, Berlin-Tempelhof, Germany, assignor to General Electric Company, a corporation of New York No Drawing. Application June 28, 1938, Serial No. 216,345. In Germany July 1, 1937

3 Claims. (Cl. 106—52)

The present invention relates to vitreous compositions generally and more particularly the invention relates to such compositions which transmit infra-red rays.

Certain glasses now commonly used in the arts, such as lead glass, transmit infra-red rays fairly well and, in general, the transmission of such rays through the glass increases as the content of silica in the glass increases. Quartz is the best infra-red ray transmitting material now available in the art but it is difficult to manufacture quartz and this material, due to its high softening temperature, is difficult to shape into useful articles.

The object of the present invention is to provide a vitreous material which is more transmissive to infra-red rays than ordinary glass or even quartz, and which is more easily workable than quartz. Still further objects and advantages attaching to the invention will be apparent to those skilled in the art from the following particular description.

I have discovered that vitreous compositions free from boric acid and phosphoric acid and containing certain materials customarily used in the glass arts, such as alkalis, alkaline earths, and alumina, and containing not more than 40% of silica are more transmissive to infra-red rays than ordinary glass and quartz and are more easily workable than quartz. Preferably the vitreous compositions of the present invention contain, in addition to silica and calcium oxide, one or more of the materials barium oxide, alumina, titanium oxide and zinc oxide. When desired, other materials, such as the oxides of magnesium, lead, bismuth, zirconium, tin, and coloring oxides, such as the oxides of uranium, chromium, and manganese are used in the vitreous compositions of the present invention to confer the particular properties on the compositions these materials are known to possess. Certain materials, such as the oxides of iron, vanadium, cobalt, copper and nickel, are known to interfere with the transmission of infra-red rays and such materials must be excluded from the compositions of the present invention.

When the vitreous material of the present invention is formed into a plate 1 mm. in thickness it transmits more than 50% of the infra-red rays incident thereon having a wave length of 4.5 microns and shorter and certain compositions embodying the invention transmit 10% and more of rays incident thereon having a wave length as long as 6 microns.

In the following table the transmission through quartz, plate glass, and several compositions of the present invention in plates 1 mm. thick of infra-red rays of various wave lengths incident on the plate are listed.

|  | Microns | | | | | | | | | | |
|---|---|---|---|---|---|---|---|---|---|---|---|
|  | 1 | 1.5 | 2 | 2.5 | 3 | 3.5 | 4 | 4.5 | 5 | 5.5 | 6 |
| Quartz glass | 90 | 90 | 90 | 89 | 86 | 85 | 71 | 45 | 5 | 0 | 0 |
| Plate glass or normal common glass | 90 | 90 | 90 | 89 | 65 | 61 | 61 | 16 | 2 | 0 | 0 |
| 34% $SiO_2$, 35% $TiO_2$, 31% CaO | 90 | 87 | 88 | 89 | 79 | 79 | 78 | 67 | 16 | 0 | 0 |
| 6.9% $SiO_2$, 49.7% CaO, 43.4% $Al_2O_3$ | 90 | 90 | 90 | 89 | 67 | 80 | 85 | 83 | 56 | 25 | 12 |
| 14.3% $SiO_2$, 71.4% CaO, 14.3% ZnO | 90 | 90 | 90 | 89 | 68 | 83 | 89 | 80 | 52 | 24 | 10 |
| 12% $SiO_2$, 76% CaO, 12% BaO | 90 | 90 | 90 | 89 | 65 | 81 | 88 | 80 | 57 | 30 | 16 |

It is apparent from the above table that the vitreous compositions of the present invention transmit rays of a wave length of between 1 and 3.5 microns as well as quartz and plate glass; transmit rays of a wave length of between 3.5 and 6 microns better than quartz and plate glass which last are opaque to rays of a wave length of between 5.5 and 6 microns.

The vitreous compositions of the present invention are useful in the arts generally and particularly in conjunction with devices capable of generating infra-red rays, such as incandescent electric lamps and electric discharge devices.

What I claim as new and desire to secure by Letters Patent of the United States is:

1. A vitreous composition which in the form of a plate one millimeter in thickness transmits more than 50 per cent of the infra-red rays having a wave length less than 4.5 microns and at least 10 per cent of the rays having a wave length as long as 6 microns, said composition comprising 12 to 15 per cent silica, 71 to 76 per cent calcium oxide and 12 to 15 per cent of one or more oxides selected from the group consisting of barium oxide and zinc oxide.

2. An infra-red ray transmitting vitreous composition consisting of about 14 per cent silica, 72 per cent calcium oxide and 14 per cent zinc oxide.

3. A vitreous composition which is more transmissive to infra-red rays than quartz, said composition consisting of about 12 per cent silica, 76 per cent calcium oxide, and 12 per cent barium oxide.

WERNER DÜSING.